(12) United States Patent
Gerlach et al.

(10) Patent No.: US 9,555,573 B2
(45) Date of Patent: Jan. 31, 2017

(54) PROCESS FOR MAKING A STRETCH-BLOW MOULDED CONTAINER HAVING AN INTEGRALLY MOULDED HANDLE

(75) Inventors: Christian Gerhard Friedrich Gerlach, St. Gilles (BE); Patrick Jean-Francois Etesse, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 980 days.

(21) Appl. No.: 12/873,368

(22) Filed: Sep. 1, 2010

(65) Prior Publication Data
US 2011/0057361 A1 Mar. 10, 2011

(30) Foreign Application Priority Data
Sep. 4, 2009 (EP) ..................................... 09169506

(51) Int. Cl.
*B29C 49/12* (2006.01)
*B29C 49/48* (2006.01)
(Continued)

(52) U.S. Cl.
CPC ........... *B29C 49/4802* (2013.01); *B29C 49/18* (2013.01); *B29C 49/6481* (2013.01); *B29C 49/06* (2013.01);
(Continued)

(58) Field of Classification Search
CPC ...... B29C 49/4802; B29C 49/06; B29C 49/18; B29C 49/6481
(Continued)

(56) References Cited

U.S. PATENT DOCUMENTS 5,202,078 A * 4/1993 Moore .......................... 264/527
7,153,455 B2 * 12/2006 Belcher ..................... 264/37.31
(Continued)

FOREIGN PATENT DOCUMENTS

CA       1296495       3/1992
EP       0 346 518 B1  2/1993
(Continued)

OTHER PUBLICATIONS

U.S. Appl. No. 13/371,987, filed Feb. 13, 2012, Gerlach.
International Search Report for International Application Serial No. PCT/US2012/047456, mailed Jan. 14, 2011, 11 pages.

*Primary Examiner* — Alison L Hindenlang
*Assistant Examiner* — Emmanuel S Luk
(74) *Attorney, Agent, or Firm* — Gary J. Foose

(57) ABSTRACT

The present invention relates to a process for making a container having an integral handle, comprising the steps of:
a) providing a preform (1) in a mould cavity (2);
b) stretch-blow moulding the preform (1) to form an intermediate container (3);
c) applying one or more inwardly moving plugs (5) to form one or more concave gripping region(s), whilst maintaining the pressure within the intermediate container (3) above 1 bar and whilst the temperature of the material in the gripping region of the intermediate container is at a temperature below the glass transition temperature, $T_g$;
d) releasing excess pressure within the container, preferably prior to withdrawing the plug (5) from within the container; and
e) ejecting the finished container(6) from the mould cavity (2,4).

10 Claims, 3 Drawing Sheets

(51) Int. Cl.
  *B29C 49/18* (2006.01)
  *B29C 49/64* (2006.01)
  *B29C 49/06* (2006.01)
  *B29K 25/00* (2006.01)
  *B29K 27/06* (2006.01)
  *B29K 67/00* (2006.01)

(52) U.S. Cl.
  CPC ........ *B29K 2025/00* (2013.01); *B29K 2027/06* (2013.01); *B29K 2067/00* (2013.01); *B29K 2067/046* (2013.01)

(58) Field of Classification Search
  USPC .................................................. 264/531, 534
  See application file for complete search history.

(56) References Cited

U.S. PATENT DOCUMENTS

| | | |
|---|---|---|
| 2002/0171161 A1 | 11/2002 | Belcher |
| 2003/0075521 A1 | 4/2003 | Miura |
| 2006/0175738 A1 | 8/2006 | Connolly et al. |
| 2006/0177615 A1 * | 8/2006 | Connolly et al. ............ 428/35.7 |
| 2007/0145646 A1 * | 6/2007 | Cho ............................. 264/529 |
| 2007/0235905 A1 * | 10/2007 | Trude et al. .................. 264/523 |
| 2008/0274318 A1 * | 11/2008 | Takada et al. ............... 428/36.9 |
| 2009/0139996 A1 | 6/2009 | Jacson et al. |

FOREIGN PATENT DOCUMENTS

| | | | |
|---|---|---|---|
| EP | 1 688 356 A2 | 8/2006 | |
| EP | 2 103 413 A1 | 9/2009 | |
| JP | 61-043535 | 3/1986 | |
| WO | WO 00/59790 | 10/2000 | |
| WO | WO 01/87573 A1 | 11/2001 | |
| WO | WO 2005/058580 A1 | 6/2005 | |
| WO | WO 2007128451 A1 * | 11/2007 | ............... B65D 1/02 |

* cited by examiner

PROCESS FOR MAKING A STRETCH-BLOW MOULDED CONTAINER HAVING AN INTEGRALLY MOULDED HANDLE

FIELD OF THE INVENTION

The present invention relates to a process for making a stretch-blow moulded container having an integrally moulded handle, preferably having a handle with good ergonomics.

BACKGROUND TO THE INVENTION

The formation of integral handles via the stretch-blow moulding process is highly desirable and the art contains a number of attempts to solve the inherent problems which have not proved successful. An integrally moulded handle is generally less expensive than a separate, e.g. clip-on, handle. Previously disclosed approaches to provide an integral handle typically require the formation of a pair of opposing depressions or cavities in the body of the bottle that form the structural basis of the handle. These depressions can either then be welded together and the central section, encompassed by the weld, can be removed such as to form a completely open space through which the fingers and/or thumb can be inserted (a 'through' handle), or, alternatively, left to simply form a grip. If the grip is formed to be sufficiently wide and deep so that a hand can close on the grip without having the tip of the fingers touch the bottom of the recess, then ergonomic studies have shown the resulting grip functionality to be as good as that of a through handle.

One approach to achieving this is disclosed in EP0346518B1, which is a process comprising a first step of blow moulding a preform in a mould cavity; then a second step of pressing and holding an area of the stretched preform between a pair of opposed movable projecting members within the blow mould, after the preform has expanded to substantially fill the inner cavity of the blow mould and before the preform has cooled to a temperature below the glass transition point of the resin.

A first problem with such a process is that the stretch-blow moulding and handle drawing steps must be performed in quick succession, otherwise the temperature decreases below the glass transition temperature. Maintenance of the temperature consumes a lot of energy and so is expensive.

It is an object of the present invention to provide a process to create a deep, concave grip which provides an ergonomic handle.

There is a need in the art for a process which is less energy intensive and in which the steps of stretch-blow moulding and handle drawing can be de-coupled. It is desirable to have a broader operating temperature range, rather than the necessity to maintain specific high temperatures. Therefore, the second step can be performed at a location away from the first step. There is also a need for the material to withstand high stresses during handle drawing to prevent material failure.

SUMMARY OF THE INVENTION

The present invention relates to a process for making a container having an integral handle, comprising the steps of:
a) providing a preform (1) in a mould cavity (2);
b) stretch-blow moulding the preform (1) to form an intermediate container (3);
c) applying one or more inwardly moving plugs (5) to form one or more concave gripping region(s), whilst maintaining the pressure within the intermediate container (3) above 1 bar and whilst the temperature of the material in the gripping region of the intermediate container is at a temperature below the glass transition temperature, $T_g$;
d) releasing excess pressure within the container, preferably prior to withdrawing the plug (5) from within the container; and
e) ejecting the finished container (6) from the mould cavity (2, 4).

DETAILED DESCRIPTION OF THE INVENTION

Figure 1A:
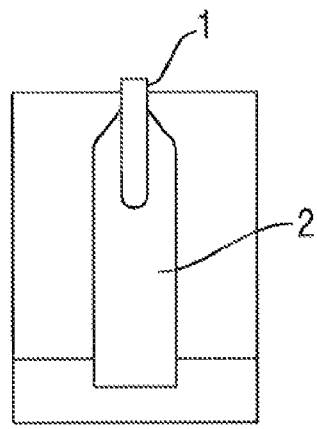
FIGS. 1A to D illustrate diagrammatically the steps according to the process of the present invention.

By "stretch-blow moulding", what is meant herein is the process in which preforms are heated above their glass transition temperature, and then blown in moulds using high pressure air to form hollow bodies, such as containers or bottles. Usually the preform is stretched with a core rod as part of the process.

By "preform" what is meant herein is a moulded form which is produced prior to expansion to form the finished object. A preform is necessarily somewhat smaller than the finished object. A preform is generally produced by, for example injection moulding, at an elevated temperature in excess of the melt temperature.

By "deep drawing" what is meant herein is the material is plastically deformed with material flow out of the plane and thickness of the sheet.

The term "deep grip" is used herein to denote a blind handle, that is to say a gripping feature which permits the user's thumb and fingers to wrap around a handle, but which does not allow the fingers to pass completely behind and through the handle. A "through" type of handle can be achieved by cutting away part, or all, of the web of material which is formed between the handle and the body of the container. The deep grip handle and the through handle from which the web has been cut-away are both within the scope of the present invention, although the deep grip is preferred.

By "biaxial orientation" what is meant herein, is the process of stretching a plastic or other article in two directions under conditions that result in molecular reorientation.

The perform is made from a plastic resin material. Plastic resin materials for use in the present invention can be polyolefins, polystyrene (PS), polyvinyl chloride (PVC), polylactic acid (PLA) or polyethylene terephthalate (PET). In one embodiment, the plastic resin material is polyethylene terephthalate (PET). Particularly preferred is polyethylene terephthalate having a low intrinsic viscosity (IV). In one embodiment, the polyethylene terephthalate has an IV of less than 0.8 dL/g. Glass transition temperature and melt temperature may be conveniently measured with reference to ASTM D3418.

Deep drawing is a forming process in the metal sheet forming industry. A sheet metal blank is radially drawn into a forming die by the mechanical action of a punch. An indicator of material formability is the limiting drawing ratio, defined as the ratio of the maximum blank diameter that can be safely drawn into a cup without flange as compared to the punch diameter. Hydromechanical deep drawing is an unconventional deep drawing process where the die is replaced by hydraulic counter pressure.

The deep drawing process can also used for various products made of thermoplastics and is attractive for the industry as the process enables high fabrication rates and enables the development of directional mechanical properties. During deep drawing, the material is plastically deformed with material flow out of the plane and thickness of the sheet. In the art, the sheet is heated to a temperature above the $T_g$ of the material, in order to reduce the flow stress and minimize the internal stresses created during deep drawing. Biaxial orientation is the process of stretching a plastic or other article in two directions under conditions that result in molecular reorientation. It is held in the art, that using a lower temperature means the plastic is too brittle and will result in failure of the material during the deep draw process. However, it has surprisingly been found that a biaxial orientation of the material at lower temperatures improves the draw-ability as the material can withstand higher stresses during deep drawing before it fails.

As a thermoplastic material is deformed the molecules will tend to align themselves in the direction of the stress which is referred to as molecular orientation. During the reheat stretch blow molding process where a preform is deformed into a container, the material is deformed in two directions: axial stretched by the stretch rod and radial stretched by the blowing pressure. The result is biaxial orientation of the material. Molecular orientation leads to anisotropy of mechanical properties; increasing orientation increases the mechanical properties like bulk modulus.

The handle drawing step is performed when the material of the intermediate container is biaxially orientated. This is advantageous in allowing the material to withstand higher stresses during the handle drawing process.

The invention will now be illustrated in more detail with reference to the drawings.

Figure 1B:
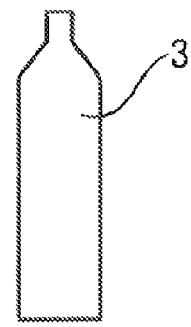
Figure 1C:
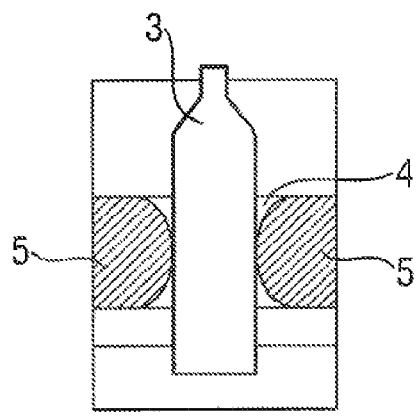
Figure 1D:
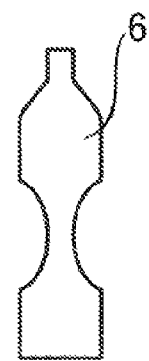

The process of the present invention can be well understood with reference to FIG. 1 showing in diagrammatic form, the steps of:
 a) providing a preform (1), in a mould cavity (2), FIG. 1A;
 b) stretch-blow moulding the preform (1) to form an intermediate container (3), FIG. 1B; optionally transferring the intermediate container into a separate, deep drawing cavity (4), and optionally reheating the intermediate container, FIG. 1C;
 c) applying one or more inwardly moving plugs (5) to form one or more concave gripping region(s), whilst maintaining the pressure within the intermediate container (3) above 1 bar and whilst the temperature of the material in the gripping region of the intermediate container is at a temperature below the glass transition temperature, $T_g$, FIG. 1C;
 d) releasing excess pressure within the container, preferably prior to withdrawing the plug (5) from within the container; and
 e) ejecting the finished container (6) from the mould cavity (2, 4), FIG. 1D.

The step shown in FIG. 1A can be done via injection stretch-blow moulding or reheat stretch-blow moulding where in the latter injection and stretch-blow moulding is done on two separate machines. Preferably the preform is a polyethylene terephthalate perform.

The step shown in FIG. 1B shows the option of providing the deep drawing cavity separately from the blow cavity. The container may be re-heated during this transfer in case the gripping region has cooled down too much during the blowing step and/or the transfer to the deep drawing cavity.

In a variation, the step shown in FIG. 1B can be eliminated if steps in FIG. 1A and FIG. 1C happen in the same cavity. This has the advantage that the time between blow moulding and deep drawing is minimized and that the tolerances on the container specifically around the deep grip are tighter as there is no relative movement of the container versus the plug. The integration in one cavity complicates the construction of the blow mould as the blow mould needs to have moveable plug(s), the blow moulding machine needs to be adapted to control the deep drawing step and the total cycle time increases as the movement of the plug adds to the blowing cycle.

In the step shown in FIG. 1C, the material in the gripping region of the intermediate container is maintained at a temperature below the glass transition temperature, $T_g$. The glass transisition temperature of PET is 81° C. In another embodiment, the material in the gripping region of the intermediate container is maintained at a temperature between the glass transition temperature, $T_g$, and 6° C. In another embodiment, the material in the gripping region of the intermediate container is maintained at a temperature between the glass transition temperature, $T_g$, and 15° C. In yet a further embodiment, the material in the gripping region of the intermediate container is maintained at a temperature between the glass transition temperature, $T_g$, and 21° C. The shape of the material in the gripping region can be substantially flat or planar, in other words it follows the contours of the side of the intermediate container. In another embodiment, the shape of the material in the gripping regions is convex. In other words, the gripping regions(s) is convex as compared to the contours of the side of the intermediate container. In yet another embodiment, the shape of the material in the gripping regions is concave. In other words, the gripping region(s) is concave as compared to the contours of the side of the intermediate container.

The surface area of the grip in the intermediate container can be equal to the surface area of deep grip in the final container. In another embodiment, the surface area of the grip in the intermediate container is smaller than the surface area of the deep grip in the final container. This results in an additional surface stretch during deep drawing and produces additional molecular orientation. This may also improve the aesthetic of the final grip section.

Furthermore, in the step shown in FIG. 1C, the bottle is pressurized to enable a positive location of the bottle in the cavity, and a plug-assist piston is forced into the gripping region to deep draw the desired deep grip recess. As the male plug fully engages, an over pressure of from about 1 to about 20 bar is applied inside the container in order to effectively act as the female mould portion of the conventional pressure-bubble/plug-assist deep drawing process. The pressure inside the bottle fulfills different functions. Firstly, it presses the bottle to the cool deep draw cavity that functions as a secondary cooling cycle after the blowing. It has been shown to be important in preventing panel and base deformation in the final container specifically if a hot blow mold is being employed. Pressures above 5 bar are sometimes needed to avoid bottle deformation. Higher pressures have been shown to be beneficial to avoid local deformations near the grip section caused by the radial tension and tangential compression stresses in the grip adjacent sections. Finally the pressure inside the bottle also acts as female hydrostatic die that shapes the thermoplastic to the metal skin of the piston. This also ensures that the non deep grip portion of the container is not deformed as the male plug deep draws the deep grip portion. Once the male plug is fully engaged, plastic is conformed to the plug and the final deep grip geometry is achieved.

In the step shown in FIG. 1D, the pressure is preferably first released, and then the plug-assist piston retracted, and the bottle ejected.

Preferred characteristics of the deep grip forming process shown in FIG. 1B to 1D are as follows:
1. The deep grip is formed after the material is bi-axially oriented;
2. The plug that forms the deep grip is an identical male shape of the final deep grip; and/or
3. The container is ejected at a temperature where mechanical deformation is hindered (below $T_g$) and material crystallizes in the final desired shape.

In point 2) it is has been found that plugs that are not a male shape of the final deep grip cause undesired wrinkles and folds in the deep grip that have a negative impact on aesthetics and performance.

The following table captures particularly preferred process settings in terms of temperature, desired molecular orientation state and desired deep grip geometry

| Step | Temperature history | Desired orientation state | Intermediate and final grip geometry |
|---|---|---|---|
| Injection | Tm | Amorphous | Not applicable |
| (Reheat) stretch blow molding | At temperatures above Tg and below Tm | Bi-axially orientated | Intermediate grip of same or less developed surface area |
| Transfer from blow cavity to deep drawing cavity | Below Tg | No additional bi-axial orientation. | |
| Deep drawing of grip | Temperature for deep drawing is below Tg | No additional significant crystal growth. May or may not have additional biaxial orientation | Grip formed by deep drawing with piston having desired final shape |
| Ejection of container | Below Tg | No additional orientation. Molecular relaxation after ejection possible. | No further shape change desired |

It can be advantageous to include venting holes in the deep drawing plug that are designed similar to venting holes conventionally used in blow moulds. When the material gets deep drawn to form the concave gripping region, the surface of the material will conform closely to the outer profile of the deep drawing plug, and the air between the bubble and the plug can escape through the venting holes. Furthermore, when the deep drawing plug is withdrawn just prior to the container ejection, the venting holes prevent a vacuum from building up between the concave gripping region and the plug that could lead to a distortion of the deep grip.

The deep grip should be ergonomically shaped to help the consumer to hold the container and pour product from the container. Anthropometric studies indicate that the minimum grip diameter of the circle formed by the thumb and forefinger when enclosing a cone (in accordance with DIN33402) for women aged 20-59 is 34 mm, which corresponds to an inside perimeter of 107 mm. Accordingly, the deep grip should provide at least this amount of grippable developed length to ensure ergonomic functionality equal to that of a through handle.

Figure 2:
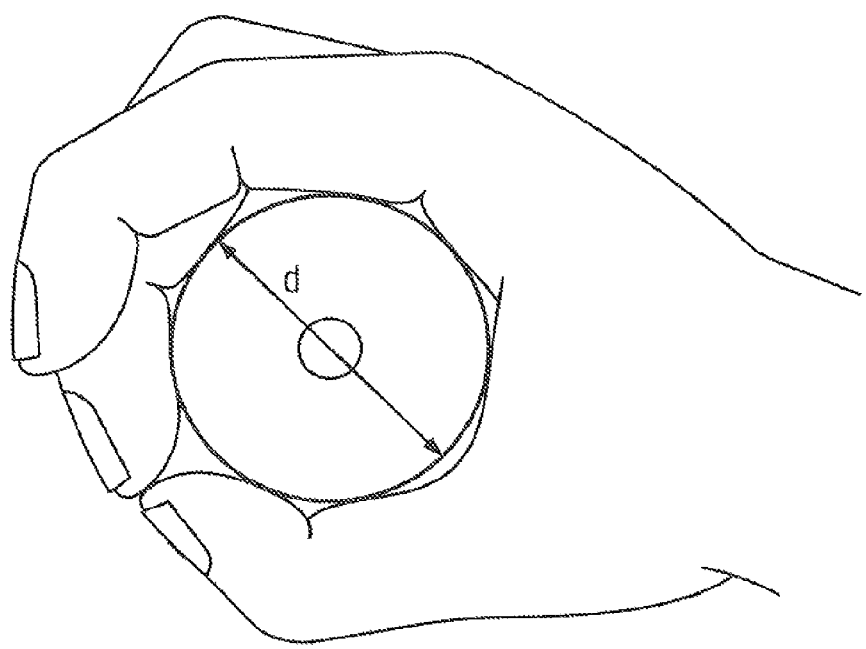
FIG. 2 shows the grip diameter measured in accordance with DIN33402.

FIG. 2 shows the grip diameter, d, defined as the minimum diameter of the circle made by the thumb and finger when enclosing a cone (in accordance with DIN 33402).

Figure 3:
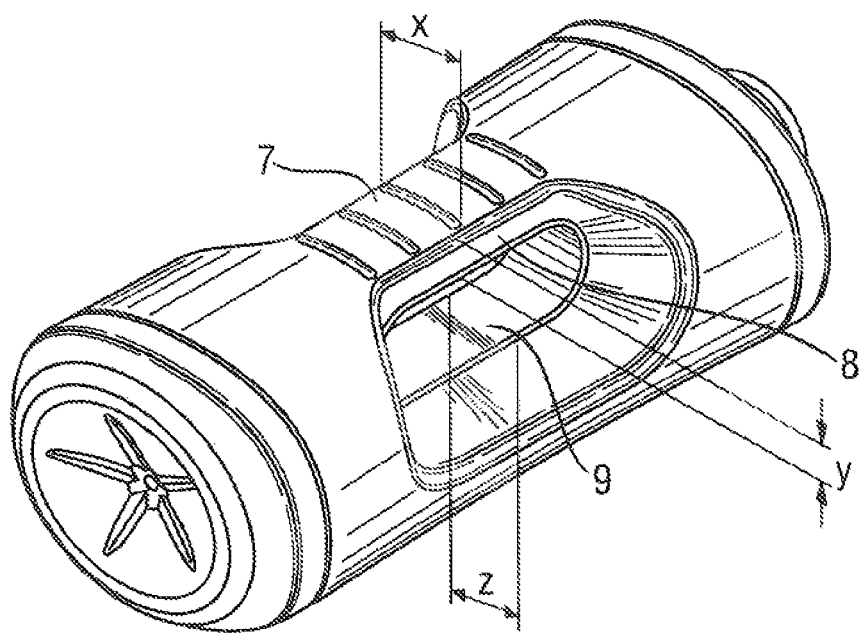
FIG. 3 shows a perspective view of a bottle with an integral handle, made according to the present invention.

FIG. 3 is a drawing of the finished container with key deep grip functional dimensions: deep grip palm rest, x, 7; deep grip finger rest, y, 8; deep grip recess depth, z, 9.

The deep grip should preferably be as deep as possible, the principle limitation being the footprint of the bottle, but preferably no less than required to generate a developed length of 107 mm. In the case of a symmetrical deep grip design as shown in FIG. 3, then x+2y+2z should preferably be no less than 107 mm. The depth of each deep grip recess (z) should preferably be greater than 20 mm (i.e., z>20 mm). In a preferred embodiment the deep grip is formed by two opposing concave gripping regions, the respective bases of which are in mutual contact.

The palm rest of the deep grip (x) should preferably be sufficiently large so that the bottle can rest intuitively against the palm of the hand and opens the hand sufficiently wide that the fingers do not touch in the bottom of the deep grip recess. It has been found by ergonomic studies that a palm rest width of greater than 30 mm (i.e. x>30 mm) is the minimum required to provide comfortable handling at parity with that of a through handle.

Opposing deep grip halves do not need to be symmetrical in terms of depth and shape as the asymmetry can improve the ergonomic performance of the container.

When the respective bases of the concave gripping regions are in mutual contact it can also be advantageous to provide means for interlocking the opposing concave gripping regions against each other such as to substantially eliminate any relative movement when gripped. An example of one such means is a "peg and pin" where both concave gripping regions meet. The peg and pin are aligned and interlocked during the deep drawing step. This avoids the need to weld opposing concave gripping regions. Such welds are undesirable because they provide weak spots which easily fail, especially under drop load.

EXAMPLES

A standard PET resin (Equipolymer C88, IV=0.76 dl/g) perform was stretch-blow moulded at a mold temperature of 65° C. The container was transferred from the blow cavity to the deep drawing cavity by direct bottle transfer within the same machine. The gripping region in the intermediate container was "flat" and maintained at a temperature between 40 and 60° C. The intermediate container was pressurized in the deep drawing cavity to 20 bar and the handle deep drawn using stepping motor controlled pistons.

The pistons matched the final grip shape. The piston and the deep drawer cavity were cooled at 6° C. The container was vented and then ejected when the grip section reached room temperature (21° C.).

The thickness of the grip section in the intermediate container was above 0.7 mm and the grip depth of 20 mm was readily achieved. A fabrication speed of 1000 bottles per hour per mould was achieved.

The local stretch ratios in the grip section on the intermediate container were between 3 and 3.5 in axial direction and 3 in hoop direction. The grip section was deep drawn increasing predominately the hoop stretch from intermediate 3x to 5x.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a container having an integral handle, comprising the steps of:
   a) providing a preform in a mould cavity ;
   b) stretch-blow moulding the preform to form an intermediate container;
   c) applying one or more inwardly moving plugs to plastically deform a portion of the intermediate container to form one or more concave gripping region(s), whilst maintaining the pressure within the intermediate container above 1 bar and whilst the temperature of the material in the gripping region of the intermediate container is at a temperature below the glass transition temperature, $T_g$, wherein the intermediate container has an intermediate surface area of grip and the gripping region in the finished container has a gripping region surface area, wherein the intermediate surface area of grip is smaller than the gripping region surface area;
   d) releasing excess pressure within the container; and
   e) ejecting the finished container from the mould cavity.

2. The process according to claim 1, wherein in step c) the temperature of the material in the gripping region of the intermediate container is maintained at a temperature between the glass transition temperature, $T_g$, and about 6° C.

3. The process according to claim 1, wherein the preform is a polyethylene terephthalate perform.

4. The process according to claim 3, wherein the glass transition temperature, $T_g$ of polyethylene terephthalate is about 81° C.

5. The process according to claim 1, wherein throughout step c) the material in the gripping region of the intermediate container is biaxially orientated.

6. The process according to claim 1, wherein step b) is carried out in a blow moulding cavity, and wherein step c) is carried out in a separate deep drawing cavity, and wherein the intermediate container is transferred from the blow moulding cavity to the deep drawing cavity between these two steps.

7. The process according to claim 1, wherein the outer profile of the plug corresponds to the interior profile of the concave gripping region.

8. The process according to claim 1, wherein there is provided means for interlocking the opposing concave gripping regions against each other such as to substantially eliminate any relative movement when gripped.

9. The process according to claim 1, wherein the gripping region of the finished container comprises deep grip palm rest, x,; deep grip finger rest, y; deep grip recess depth, z, and preferably wherein the sum of x +2y +2z is greater than about 107 mm, and preferably the depth of the deep grip recess is greater than about 20 mm (z >about 20 mm).

10. The process according to claim 1, wherein the step of releasing excess pressure within the container occurs prior to withdrawing the plug from within the container.

* * * * *